Jan. 6, 1925.

1,521,756

C. J. COTE

WHEEL

Filed May 31, 1921

WITNESSES:

L. I. Plummer

P. V. Green.

INVENTOR.

Clifford J Cote.

BY

Robert W Pearson,

ATTORNEY.

Patented Jan. 6, 1925.

1,521,756

UNITED STATES PATENT OFFICE.

CLIFFORD J. COTE, OF LOS ANGELES, CALIFORNIA.

WHEEL.

Application filed May 31, 1921. Serial No. 473,666.

*To all whom it may concern:*

Be it known that I, CLIFFORD J. COTE, a citizen of the United States, residing at Los Angeles, in the county of Los Angeles and State of California, have invented certain new and useful Improvements in a Wheel, of which the following is a specification.

The object of my invention is to provide a means to hold two pneumatic tires on a wheel with little, if any, change in its construction, or to provide a means for other wheels which may be built in conjunction with my invention.

Other objects are simplicity of construction and efficiency of operation.

The improvements comprising my invention consists in particular of a wheel with quick detachable means for dual tires and rims.

More generally, my invention consists of the combination of wedge-rings and rims with clamping means to mount and secure the same to the wheel, with quick mounting and releasing slots and slotted holes to receive the valve stems.

Figure 1:
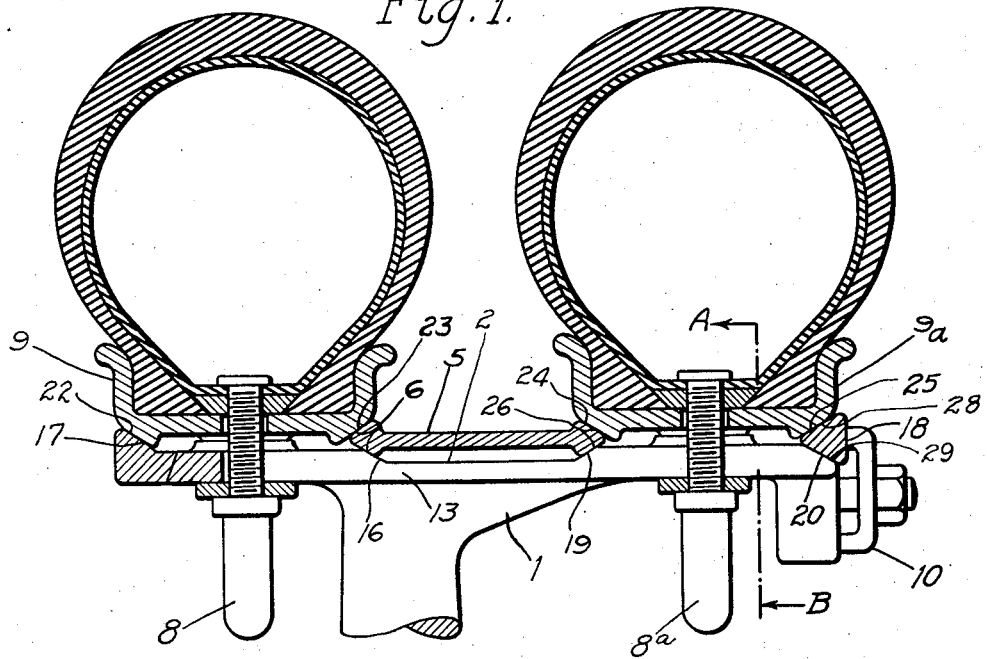
Figure 1 is an axial section of a wheel embodying my invention.
Figure 2:
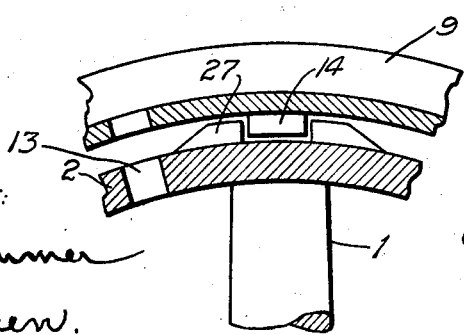
Figure 2 is a sectional view of Figure 1 taken on line A—B.

Referring to the drawing in which like characters of reference designate similar parts in the two figures, 1 designates a wheel formed with a base rim 2. An outwardly extending wedge face 17 is formed at one edge of the base rim and an inwardly extending wedge face 20 is formed at the other edge of said base rim. The periphery of the base rim 2 is depressed and formed with a pair of spaced inwardly extending wedge faces 16 and 19 intermediate the edges of the rim. A separator ring 5 surrounds the base rim 2, which ring is formed with a pair of wedge faces 6 at one edge and with a pair of wedge faces 26 at its other edge, the inner wedge faces 6 and 26 engaging the intermediate wedge faces 16 and 19 of the base rim. A pair of tire rims 9 and 9ª surround the base rim 2. The tire rim 9 is formed at its inner corner edges with a pair of inwardly extending converging wedge faces 22 and 23 which respectively engage the wedge face 17 of the base rim 2 and the upper wedge face 6 of the separator ring 5. The tire rim 9ª is formed at its inner corner edges with a pair of inwardly extending converging wedge faces 24 and 25 which respectively engage the upper wedge face 26 of the separator ring 5 and the upper wedge face 28 of a wedge ring 18, the lower wedge face 29 of said wedge ring engaging the wedge face 20 of base rim 2. The base rim is provided with a transverse slot extending through one edge thereof to receive the valve stems 8 and 8ª of the tires mounted in the tire rims 9 and 9ª. The wedge ring 18 is held in position by clamps 10 whereby the tire rim 9ª is held on the base rim 2.

Stops 14 are formed on the under side of the tire rims 9 and 9ª which fit between shoulders 27 on the periphery of the base rim 2, whereby creeping of the tire rims is prevented.

Having thus described the invention, what I claim is:

1. In a wheel of the class described, a base rim formed with a wedge face, extending outwardly from its periphery at one edge thereof, a wedge face extending inwardly from its periphery at the other edge thereof, and with a pair of wedge faces extending inwardly from its periphery intermediate the edges of the rim, a pair of tire holding rims adapted to fit over the periphery of said base rim, each of said tire holding rims being formed with wedge faces on their inner sides at their edges, a split separator ring fitting over the periphery of said base rim, a pair of wedge faces at each edge of said separator ring, the inner wedge faces of said separator ring being adapted to engage respectively the two wedge faces intermediate the edges of the base rim and the outer wedge faces of the separator ring being adapted to engage one of the wedge faces of said tire holding rims respectively, the wedge face of one of said tire holding rims engaging the wedge face extending outwardly at one edge of the base rim, a wedge ring for engaging the other wedge face of the other tire holding rim, and the wedge face extending inwardly from the other edge of said base rim, and means for locking said wedge ring in position.

2. In a wheel of the class described, a base rim formed with a wedge face, extending outwardly from its periphery at one edge thereof, a wedge face extending inwardly from its periphery at the other edge thereof, and with a pair of wedge faces extending inwardly from its periphery intermediate the edges of the rim, a pair of tire holding rims adapted to fit over the periphery of said base rim, each of said tire holding rims being formed with wedge faces on their inner sides at their edges, a split separator ring fitting over the periphery of said base rim, a pair of wedge faces at each edge of said separator ring, the inner wedge faces of said separator ring being adapted to engage respectively the two wedge faces intermediate the edges of the base rim, and the outer wedge faces of the separator ring being adapted to engage one of the wedge faces of said holding rims respectively, the other wedge face of one of said tire holding rims engaging the wedge face extending outwardly at one edge of the base rim, a wedge ring for engaging the other wedge face of the other tire holding rim, and the wedge face extending inwardly from the other edge of said base rim, and means for locking said wedge ring in position, said base rim having a transverse slot extending from one edge thereof to receive the valve stems of the tires held in said tire rims.

In testimony whereof I affix my signature.

CLIFFORD J. COTE.